April 21, 1959     W. F. MARANTETTE     2,883,529
VOLTAGE MONITORING CIRCUITS
Filed March 15, 1954
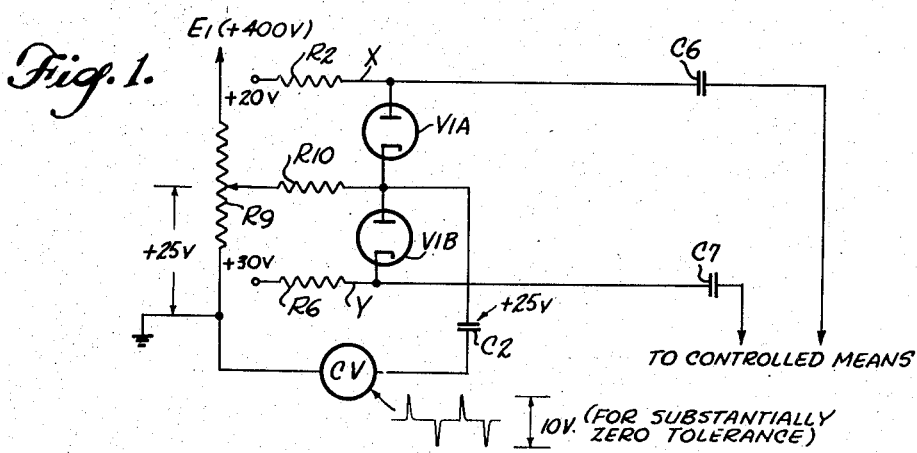
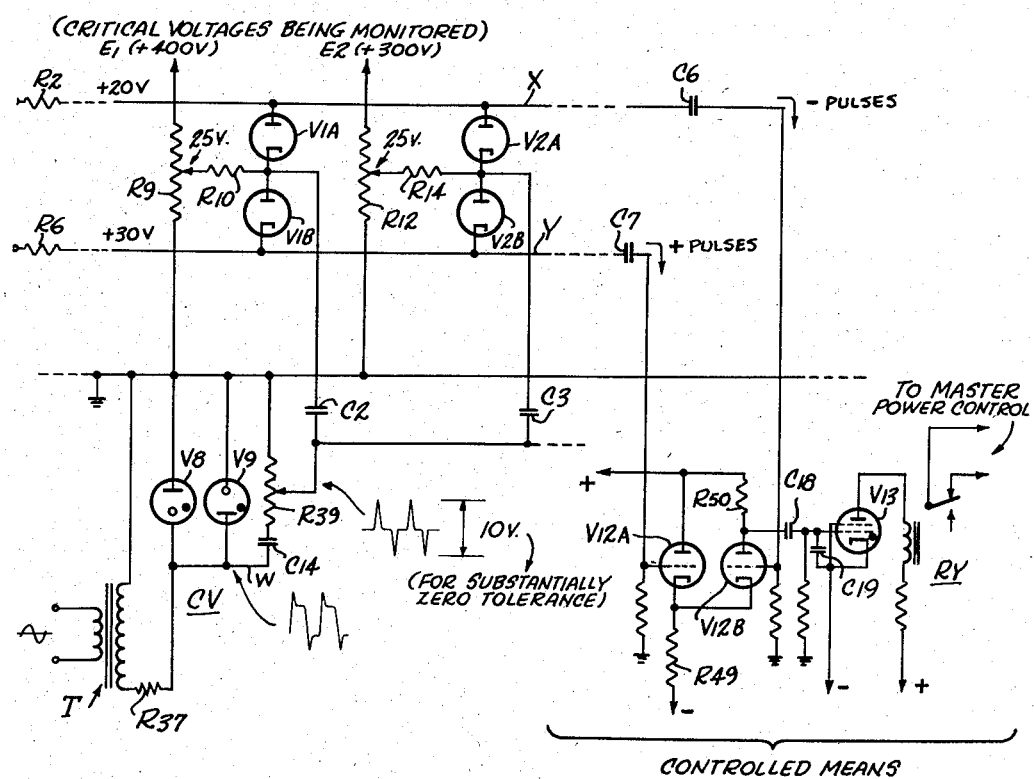
INVENTOR.
WILLIAM F. MARANTETTE
BY
ATTORNEYS

United States Patent Office 2,883,529
Patented Apr. 21, 1959

2,883,529

VOLTAGE MONITORING CIRCUITS

William F. Marantette, Manhattan Beach, Calif., assignor to Boeing Airplane Company, Seattle, Wash., a corporation of Delaware Application March 15, 1954, Serial No. 416,365

12 Claims. (Cl. 250—27)

This invention relates to a circuit for monitoring voltages and more particularly for sensing the departure of any one of a plurality of different voltages by more than a predetermined amount from its normal value. The invention is herein illustratively described by reference to its presently preferred form as applied to the problem of protectively deenergizing electronic apparatus automatically in the event any of a plurality of different critical voltages therein fails to remain constant within certain limits. It will be understood, however, that certain modifications and variations in the circuit may be made and the same may be employed in different applications without exceeding the scope of the invention.

The above-mentioned type of protection for electronic apparatus could be provided with a plurality of relays arranged to be energized by the respective critical voltages to be monitored. However, relays built with the required precision and sensitivity for this purpose are relatively expensive and may be prohibitively expensive if a large number of them are required. Moreover, such relays are subject to mechanical vibrations and other influences tending to vary the operation of electromagnet-mechanical devices. The present invention accomplishes the desired result by electronic means more inexpensively and reliably than in the past.

In accordance with the improved circuit as herein disclosed, the critical voltages to be monitored are applied to individual dividing networks which are separately adjusted so that in each a critical potential is derived proportionately related to the particular applied critical voltage and substantially equal to the critical potentials derived from the remaining voltage dividing networks. If a critical voltage to be monitored happens to equal said critical potential the dividing network will have a unity division ratio, i.e. no voltage division is necessary. A corresponding plurality of pairs of rectifiers are provided. The anode of one rectifier in each pair is connected to a first source of reference potential below said derived critical potential and the cathode of the second rectifier of each such pair is connected to a second source of reference potential equally above said critical potential, the anode of the second rectifier being connected to the cathode of the first in each such pair. A source of control alternating voltage having negative and positive peak values respectively less than the differences between said first and second reference source potentials and said derived critical potential is then connected in circuit with each such pair of rectifiers, and the associated voltage divider. The respective connecting circuits cause the alternating potential of the control voltage source to be added algebraically to the derived critical potential of each voltage divider for application to the interconnected cathode and anode of the assocated rectifier pair. As a result, departure of any of the critical voltages by more than a given fractional amount from its assigned value causes pulsating current to flow in one rectifier or the other of the associated pair of rectifiers. By providing controlled means energizable by such pulsating current in any of the rectifiers, the entire electronic apparatus may be protectively deenergized whenever any of the critical voltages varies beyond permissive limits. Such limits are established for all of the critical voltages by selecting the amplitude of the control alternating voltage in relation to the difference between the first and second reference potentials.

The foregoing and other features, objects and advantages of the invention will become more fully evident from the following description by reference to the accompanying drawings.

Figure 1 is a schematic diagram illustrating an elemental monitoring circuit.

Figure 2 is a schematic diagram of the described voltage monitoring protective system.

Figure 1 illustrates the manner in which departure of a critical voltage beyond an upper or a lower limit is caused to produce pulses of current in the monitoring circuit capable of energizing a suitable controlled means (not shown). By way of illustration only, the critical voltage E1 is assumed to be 400 volts positive in relation to ground potential. The first reference voltage source represented by conductor X produces a reference potential of 20 volts positive and the second reference voltage source represented by conductor Y produces a reference potential of thirty volts positive. The critical voltage E1 is applied to a voltage divider comprising potentiometer R9, the wiper of which is adjusted to a potential mid-way between the first and second reference source potentials, namely 25 volts positive.

A pair of unidirectionally conductive devices in the form of diode rectifiers V1A and V1B are provided with a connection between the cathode of V1A and the anode of V1B and with connections between the anode of V1A and reference source conductor X and between the cathode of V1B and reference source conductor Y. The interconnected cathode and anode are impressed with a potential representing the algebraic sum of the critical potential derived from potentiometer R9 (namely 25 volts more or less in the example) and the potential of a control alternating voltage source CV. An illustrative circuit by which these potentials are added together algebraically and applied to the common connection between rectifiers V1A and V1B comprises the resistance R10 interposed between such common connection and the wiper of potentiometer R9, and the D.C. blocking condenser C2 interposed between such common connection and one terminal of the control voltage source CV. The opposite terminal of the control voltage source is connected to the lower end of the winding of potentiometer R9, which is grounded.

Preferably the alternating voltage produced by the control voltage source CV is in the form of very short alternately positive and negative pips or impulses lasting only a small fraction of the interval between pips. By establishing the peak-to-peak amplitude of this control alternating voltage at a value equal to the difference between reference potentials on conductors X and Y, namely ten volts in the example, the monitoring circuit is rendered sensitive to any appreciable departure of the critical voltage E1 from its assigned value. A reduction in the peak-to-peak amplitude of this control voltage renders the monitoring circuit less sensitive, that is, increases its tolerance to variations in the critical voltage being monitored. In this regard it will be borne in mind that the critical potential derived from potentiometer R9 is but a small fraction of the critical voltage E1 in the illustrated circuit. Consequently, when a voltage divider is used in order to produce the critical potential applied to the interconnected anode and cathode of tubes V1B and V1A, respectively, any adjustment in the amplitude of control voltage source CV for control purposes produces a corresponding but greater change in the permissive variations in critical voltage E1, the ratio being substantially the same as that between critical voltage E1 and the critical potential derived from voltage dividing potentiometer R9.

The foregoing may be understood more readily from the operation of rectifiers V1A and V1B which are subjected to the respective reference potentials on conductors X and Y and to the algebraic voltage summation mentioned above. D.C. blocking condenser C2 carries a voltage which is equal in value to the magnitude of the control potential derived from potentiometer R9, namely 25 volts in the example. Therefore, in the absence of voltage from the control voltage source CV the cathode of rectifier V1A and the anode of rectifier V1B are placed at this same potential, which is mid-way between the first and second reference source potentials. In other words, the cathode of rectifier V1B is normally five volts above its anode whereas the anode of V1A is normally five volts below its cathode. Under this condition obviously neither rectifier conducts. However, by applying the voltage produced by the control voltage source CV in series with the voltage carried by condenser C2, the common connection between the pair of rectifiers is alternately increased above twenty-five volts and decreased below twenty-five volts for short instants of time representing the duration of the positive and negative pips produced by the control voltage source. Assuming the critical potential derived from potentiometer R9 is exactly twenty-five volts and the amplitude of the positive and negative pips is exactly five volts, it will be evident that the potential on the cathode of V1A is intermittently lowered to the potential of its anode, whereas the potential on the anode of V1B is intermittently raised to the potential of its cathode. Hence, each of the two rectifiers under these assumed conditions is placed at the verge of conduction recurrently by the control alternating voltage.

If under the foregoing conditions the critical voltage E1 should depart from the assigned value (i.e. four hundred volts positive in the example), then the potential derived from potentiometer R9 would no longer be exactly twenty-five volts. Should this potential rise above twenty-five volts a like change in the voltage carried by condenser C2 will occur and during the positive pips from control source CV rectifier V1B will be rendered momentarily conductive. On the other hand, should the control potential derived from potentiometer R9 decrease below the normal twenty-five volts positive, rectifier V1A will be rendered conductive by the negative pips applied. In the first instance impulses of voltage are transmitted through coupling condenser C7 to the controlled means (not shown), whereas in the second instance voltage impulses are transmitted to the controlled means through coupling condenser C6. The resistor R2 permits such voltage impulses to be developed on conductor X by isolating such conductor from the actual source of reference potential, whereas resistor R6 serves a similar purpose for conductor Y. By suitable provisions made in the controlled means to respond to the impulses transmitted through either channel suitable operations may be controlled automatically whenever the critical voltage E1 varies by more than a predetermined amount from its assigned value. As previously mentioned the amount of variation permitted is established by adjusting the amplitude of control voltage source CV to different values less than half the difference between the first and second reference source potentials (i.e. five volts).

Figure 2 illustrates the manner in which the above principles are applied for monitoring a number of critical voltages for control purposes. In this figure the controlled means includes a relay RY by which a master power control (not shown) is actuated in order to de-energize completely an entire electronic apparatus should any one of the critical voltages therein depart materially from its assigned value. For this purpose any number of critical voltages E1, E2, etc., may be monitored. Moreover, these voltages may differ from one another by any amount as long as the lowest voltage to be monitored is normally equal to or exceeds the median potential of conductors X and Y. In the example it is assumed that all of the critical voltages are positive in relation to ground. A similar type of circuit may be used for monitoring negative voltages.

In Figure 2 components which correspond to those already described in reference to Figure 1 bear like designations. Thus, in Figure 2 one of the voltages to be monitored, E1, is applied to the voltage dividing potentiometer R9 connected through resistor R10 to the pair of rectifiers V1A and V1B which in turn bridge between the reference source conductors X and Y. A second critical voltage E2, assumed to be three hundred volts positive, is applied to the voltage dividing potentiometer R12 having its wiper connected through resistance R14 to the common connection between rectifiers V2A and V2B likewise bridging between conductors X and Y. A similar voltage divider, rectifier pair and associate connections will be provided for each additional critical voltage to be monitored. In case the critical voltage to be monitored is the median between the potentials of conductors X and Y no voltage dividing means is required for monitoring that voltage. As will be evident, the cost of monitoring an additional voltage is slight in any case. This is true because major portions of the circuit are common to all sections individually associated with the different critical voltage receiving terminals.

The details of a suitable control alternating voltage source CV capable of producing positive and negative pips of selective amplitude for application to each pair of rectifiers also appear in Figure 2. This control voltage source includes a transformer T the secondary of which has one terminal grounded and its opposite terminal connected through a voltage dropping resistor R37 to the cathode of voltage regulator diode V8 and to the anode of voltage regulator diode V9, the anode of the former and the cathode of the latter being grounded. When these gaseous discharge V-R tubes are subjected to the transformer secondary voltage, assumed to be a sine wave, alternately positive and negative flat-topped voltage pulses appear on conductor W to which the cathode of V8 and the anode of V9 are connected. The leading edges of these positive and negative pulses are peaked, rising and falling to amplitudes representing the ionizing potential of the two V-R tubes. Since the ionizing potential of tubes of this type is predictable and constant within very close limits, the peak amplitudes, positive and negative, of the voltage impulses applied to the R-C differentiating network comprising condenser C14 and the resistance of potentiometer winding R39 remains substantially constant despite any tendency for the secondary voltage of transformer T to vary. The values of condenser C14 and resistance R39 are selected so that the condenser fully charges during the respective positive and negative peaks representing the leading edges of the peaked flat-topped waves appearing on conductor W. Thus, alternately positive and negative pips of voltage are developed across the winding of potentiometer R39, and by adjusting the wiper position of this potentiometer, these voltage pips may be applied at any selected amplitude as control voltage from the source CV.

In effect, that portion of the winding of potentiometer R39 between its wiper and ground constitutes a source of control alternating voltage which is connected through each of the D.C. blocking condensers C2, C3, etc., to the respective rectifier pairs V1A—V2A—V2B, etc. Thus the rectifier pairs associated with the various critical voltages to be monitored are impressed with the algebraic sums of the potentials derived from their respective voltage divider potentiometers and the control voltage pips generated by the source CV common to all of the algebraic addition circuits.

In this latter regard it will be noted that the phyical setting of the wiper of potentiometer R12 will differ from that of potentiometer R9 due to the fact that the voltages E1 and E2 differ from each other and it is desired to apply the same critical potential to the respective rectifier pairs in order that the same reference voltage sources X and Y and the same control alternating voltage source CV may be used in common with all the voltage comparing rectifier pairs. Moreover, with this arrangement monitoring of the different critical voltages is carried out on a percentage tolerance rather than an absolute tolerance basis. In other words, substantially the same percentage change of voltage E2 is necessary in order to produce a response in the monitoring circuit as the percentage change in voltage E1 necessary to produce the same response, whereas the quantitative change in terms of volts is smaller in the first case than in the second. This result follows from the necessary difference in the voltage division ratio taking place in the respective potentiometers R12 and R9 in order to provide substantially equal critical potentials at their respective wipers (i.e. 25 volts in the example).

The following are suitable types and values for components which may be incorporated together in the illustrated circuit, the values of remaining components being more readily determined by known design considerations.

| | | |
|---|---|---|
| V1A, V1B, V2A, V2B | | 6AL5 |
| V8, V9 | | OB2 |
| C14 | mfd | .1 |
| R39 | k. pot | 24 |
| R9, R12 | k. pot | 425 |
| C2, C3 | mfd | .05 |
| R10, R14 | k | 100 |
| C6, C7 | mfd | .05 |
| V12A, V12B | | 12AT7 |
| R49, R50 | k | 56 |
| C18 | mfd | .05 |
| C19 | mfd | .001 |
| V13 | | 2D21 |

By way of further example let it be assumed that the rectifiers comprising the pairs V1A—V1B, V2A—V2B, etc., are substantially perfect unidirectionally conductive devices and that the wiper of potentiometer R39 is adjusted so that eight volts peak-to-peak alternating voltage potential is applied to the addition circuits. Since the setting of potentiometer R12 is such that its wiper derives 25/300 or 1/12 the critical voltage E2, it will be necessary for voltage E2 to vary by twelve times the difference between the amplitude of the control alternating voltage (four volts, under the assumption) and half the difference between the reference potentials on conductors X and Y (five volts being half the difference) before either rectifier V2A or V2B becomes conductive during control voltage peaks. Thus, a departure in excess of twelve volts from the assigned value of three hundred volts for E2 is necessary before voltage impulses are transmitted through one of the coupling condensers C6 or C7 to the controlled means. Similarly, the potential derived from potentiometer R9 being 25/400 or 1/16, the critical voltage E1, a departure in excess of sixteen volts of E1 from its assigned value of four hundred volts will be necessary to produce a like response in the circuit. In each instance the tolerance is four percent. By halving the above-mentioned arithmetic difference of potentials the tolerance is reduced to two percent. It will therefore be seen that adjustment of potentiometer R39 affords a means for controlling the tolerance, i.e. the permissive percentage variation of the various control voltages being monitored.

Should any of the critical voltages being monitored depart from its assigned value beyond the circuit tolerance sufficiently to energize the control means, the relay RY will be actuated and power removed from the entire electronic apparatus utilizing the critical voltages in this particular example. If one of the critical voltages rises above the upper limit permitted by the circuit, recurrent positive impulses will be transmitted through the coupling condenser C7 to the control grid of cathode follower amplifier V12A. The resulting positive pulses developed across the cathode load resistance R49 and applied to the cathode of amplifier V12B produce corresponding positive pulses at the anode of such amplifier, which are coupled through condenser C18 of the control grid of the gaseous discharge tetrode V13 for energizing the relay RY. Once tube V13 is ionized, a continuous flow of plate current takes place for maintaining the relay RY in energized condition, since the first grid of this Thyratron loses control once the tube commences to conduct.

Condenser C19 connected between grid and cathode of Thyratron V13 has an integrating effect requiring more than merely one or two pulses from amplifier V13 for triggering such Thyratron. Thus very brief or momentary departures of a critical voltage from its assigned value will not actuate the relay. This condenser may be varied in size or eliminated altogether if desired.

Similarly, should any of the critical voltages being monitored drop below the lower limit permitted by the circuit, negative impulses will be applied to the control grid of amplifier V12B and positive impulses will be developed across the plate load resistor R50 for application to the control grid of V13. In either case, therefore, the relay RY is energized whenever a critical voltage exceeds its upper or lower limit.

Obviously, other types of circuits responsive to either negative or positive impulses transmitted through the coupling condensers C6 and C7, respectively, could be substituted for the controlled means illustrated in Figure 2. It will likewise be apparent that having proper regard for phasing it is possible to adapt the monitoring circuit for the purpose of monitoring critical alternating voltages, and that alternating voltages may be substituted for the direct voltages comprising the two reference source potentials, if proper regard for phasing is had in respect to the control alternating voltage.

With the particular type of algebraic voltage addition circuit used in the illustrated system it is desirable that the control alternating voltage be in the form of very short positive and negative pips. If a purely flat-topped wave were delivered by the control voltage source CV, and one of the critical voltages E1, E2, etc. commenced to drift very slowly from its assigned value, one of the rectifiers in the associated rectifier pair could conduct very slightly on successive half-cycles of the control voltage without at first providing impulses of sufficient amplitude to the controlled means for actuating such means. During such half-cycles of rectifier conduction an incremental charge will be added to the associated D.C. blocking condenser C2, C3, etc., and this charge will build up in opposition to the effect of increasing departure of critical voltage from its assigned value. Consequently, the particular critical voltage which is varying may greatly exceed the intended limit without producing any response in the controlled means due to the blocking effect of the cumulative charge on the addition circuit condenser. However, by differentiating the otherwise substantially flat-topped waves produced so as to apply very short pips for sampling purposes to the rectifier pairs, no appreciable charge on these condensers develops even though a rectifier does conduct during one or more pips before the output pulses transmitted through one of the coupling condensers C6 or C7 become sufficient for purposes of triggering the Thyratron V13.

These and other aspects of the novel voltage monitoring circuit and the various possible modifications and variations therein will be apparent to those skilled in the art.

I claim as my invention:

1. In combination, electric circuit means having a source of critical potential to be detected for variation thereof beyond predetermined upper and lower limits, controlled means to be energized in response to such variations, and detecting means producing energization of said controlled means by such variation, said detecting means comprising a pair of unidirectionally conductive devices each having an anode and a cathode, the cathode of the first such device being connected to the anode of the second such device, a first reference voltage source applying potential below said critical potential to the anode of such first device, a second reference voltage source applying potential above said critical potential to the cathode of said second device, a source of control alternating voltage having negative and positive peak values less than the respective differences between said first and second reference source potentials and said critical potential, said source of critical potential being independent from said source of control alternating voltage, circuit means interconnecting said control voltage source and said critical potential source and applying the respective potentials of said control voltage source and of said point of critical potential in algebraically additive relationship directly to the anode and cathode of said second and first unidirectionally conductive devices respectively, and energizing connections to said controlled means from the anode of said first unidirectionally conductive device and from the cathode of said second unidirectionally conductive device, producing energization of said controlled means by conduction of either such device.

2. The combination defined in claim 1, wherein the circuit means applying the critical potential and the control voltage source potential in algebraically additive relationship comprises a connection including a D.C.-blocking condenser between one side of said source and the interconnected anode and cathode of the rectifier pair, and a connection including a resistance between the point of critical potential and such interconnected anode and cathode.

3. The combination defined in claim 2, wherein the control voltage source comprises a generator of alternately positive and negative voltage pips of short duration relative to the time lapse between successive pips.

4. The combination defined in claim 3, wherein the control voltage source comprises a pair of gaseous discharge diodes shunted with opposite polarity across a source of alternating voltage having a series resistance, a differentiating circuit comprising a condenser and a resistance connected across said diodes and connections applying voltage developed in said resistance to one side of the D.C.-blocking condenser.

5. The combination defined in claim 4, wherein the differentiating circuit resistance comprises adjustable means for deriving a varying fractional portion of the total voltage developed across such resistance, for application of such fractional portion to the D.C.-blocking condenser.

6. The combination defined in claim 1, wherein the control voltage source includes means to vary the amplitude of the control alternating voltage applied to the algebraic addition circuit, and thereby to vary the difference between the upper and lower critical potential limits.

7. A voltage monitoring circuit comprising, in combination with apparatus having a plurality of different critical voltages to be monitored, a plurality of voltage dividers impressed with the respective critical voltages and each in turn providing an output critical potential normally equal to the output critical potentials provided by the remainder of such voltage dividers, controlled means to be energized in response to variations in said critical potential beyond predetermined upper and lower limits, and detecting means producing energization of said controlled means by such variation, said detecting means comprising a plurality of pairs of unidirectionally conductive devices each having an anode and a cathode, the cathode of the first such device of a pair being connected to the anode of the second such device thereof, a first reference voltage source applying potential below said critical potential to the anodes of such first devices, a second reference voltage source applying potential above said critical potential to the cathodes of said second devices, a source of control alternating voltage having negative and positive peak values less than the respective differences between said first and second reference source potentials and said critical potential, algebraic addition circuit means applying the algebraic sums of said control alternating voltage and the critical potentials derived from the respective voltage dividers to the anode and cathode of said second and first unidirectionally conductive devices of the pairs of such devices respectively associated with such voltage dividers, and common energizing connections to said controlled means from the anodes of said first unidirectionally conductive devices and from the cathodes of said second unidirectionally conductive devices of the pairs of devices, producing energization of said controlled means by conduction of either such device.

8. The combination defined in claim 7, wherein the algebraic addition circuit means applying the critical potential and the control voltage in algebraically additive relationship comprise a connection including a D.C.-blocking condenser between one side of said source and each rectifier pair, and a connection including a resistance between each such pair and the associated voltage divider.

9. The combination defined in claim 8, wherein the control voltage source comprises a generator of alternately positive and negative voltage pips of short duration relative to the time lapse between successive pips.

10. The combination defined in claim 7, wherein the control voltage source includes means to vary the amplitude of the control alternating voltage applied to the algebraic addition circuit, and thereby to vary the difference between the upper and lower critical potential limits.

11. Voltage monitoring apparatus comprising in combination with electric circuit means having a plurality of different critical voltages to be monitored for variation thereof beyond predetermined limits, a plurality of voltage dividers impressed with the respective critical voltages and having separate output connections carrying the same critical potential constituting different fractional proportions of the respective critical voltages applied to such voltage dividers, two reference voltage sources respectively providing a first reference potential below said critical potential and a second reference potential equally above said critical potential, a plurality of potential comparing circuits each having two voltage comparing, unidirectionally conductive elements therein subjected on one side to said critical potential and on their opposite sides respectively to said first and second reference source potentials, control voltage means and circuit connections therefor applying control potentials respectively to said one side of said voltage comparing elements additively in relation to the critical potentials applied thereto, said control potentials being less than half the difference between said first and second reference potentials and comprising recurrent pulses of respectively opposite polarity, the control potential pulses applied to the voltage comparing element subjected to the first reference potential being positive and those applied to the second voltage comparing element subjected to the second reference potential being negative in polarity, whereby conduction occurs in said voltage comparing elements whenever a voltage divider critical potential, hence the corresponding critical voltage, appreciably exceeds a predetermined limit, and controlled means responsive to conduction in any such voltage comparing element.

12. Voltage monitoring apparatus comprising in combination with electric circuit means having a source of critical potential to be monitored for variation thereof beyond predetermined limits, two reference voltage sources respectively providing a first reference potential below said critical potential and a second reference potential equally above said critical potential, two voltage comparing, unidirectionally conductive elements subjected on one side to said critical potential and on their opposite sides, respectively, to said first and second reference voltage source potentials, control voltage means and circuit connections therefor applying control potentials to said first side of said voltage comparing elements additively in relation to the critical potential applied thereto, said control potentials comprising recurrent pulses of respectively opposite polarity, whereby conduction occurs in one of said voltage comparing elements when said critical potential exceeds one limit, and controlled means responsive to conduction in one of said voltage comparing elements.

References Cited in the file of this patent

UNITED STATES PATENTS

| | | |
|---|---|---|
| 2,471,835 | Norgaard | May 31, 1949 |
| 2,490,026 | Buckbee | Dec. 6, 1949 |
| 2,557,729 | Eckert | June 19, 1951 |
| 2,570,442 | Grosdoff | Oct. 9, 1951 |
| 2,602,918 | Kretzmer | July 8, 1952 |
| 2,647,238 | Bailey | July 28, 1953 |
| 2,666,136 | Carpenter | Jan. 12, 1954 |
| 2,674,727 | Spielberg | Apr. 6, 1954 |
| 2,675,473 | Femmer | Apr. 13, 1954 |
| 2,721,262 | Dinger et al. | Oct. 18, 1955 |